United States Patent
Jones

(10) Patent No.: US 9,876,709 B1
(45) Date of Patent: Jan. 23, 2018

(54) ALIGNMENT DETECTION IN A MULTI-LANE NETWORK INTERFACE

(71) Applicant: Xilinx, Inc., San Jose, CA (US)

(72) Inventor: Ben J. Jones, Edinburgh (GB)

(73) Assignee: XILINX, INC., San Jose, CA (US)

( * ) Notice: Subject to any disclaimer, the term of this patent is extended or adjusted under 35 U.S.C. 154(b) by 250 days.

(21) Appl. No.: 14/472,248

(22) Filed: Aug. 28, 2014

(51) Int. Cl.
*H04J 3/07* (2006.01)
*H04L 12/707* (2013.01)

(52) U.S. Cl.
CPC .................................. *H04L 45/24* (2013.01)

(58) Field of Classification Search
CPC .......... H04J 3/06; H04J 3/0605; H04J 3/0635; H04L 7/04; H04L 7/0041; H04L 7/045; H04L 27/2656
USPC .................................... 370/395.62, 503, 509
See application file for complete search history.

(56) References Cited

U.S. PATENT DOCUMENTS

| | | | | |
|---|---|---|---|---|
| 6,748,039 B1* | 6/2004 | Bates | ......................... | G06F 5/10 375/354 |
| 2004/0117584 A1* | 6/2004 | Banerjee | ................... | G06F 5/01 711/201 |
| 2008/0232509 A1* | 9/2008 | Jonsson | ................... | H04L 7/043 375/296 |
| 2014/0006670 A1* | 1/2014 | Wagh | .................. | G06F 13/4027 710/305 |
| 2015/0089319 A1* | 3/2015 | Ghiasi | .................... | H04L 1/0063 714/758 |
| 2016/0056886 A1* | 2/2016 | Kitamura | .............. | H04L 49/552 398/5 |

* cited by examiner

*Primary Examiner* — Andrew Chriss
*Assistant Examiner* — Kenan Cehic
(74) *Attorney, Agent, or Firm* — Robert M. Brush; Keith Taboada

(57) ABSTRACT

In an example implementation, an alignment detection circuit includes a buffer, a candidate selection circuit, and a correlator circuit. The buffer is configured to receive a data stream from a data lane, the data stream including alignment markers delineating data frames, each of the alignment markers having a predefined bit pattern. The candidate selection circuit is configured to identify candidate data blocks in successive data blocks of the data stream provided by the buffer, each of the candidate blocks having a measure of symmetry satisfying a threshold metric indicative of the predefined bit pattern. The correlator circuit is configured to search for at least one of the alignment markers in each of the candidate blocks and adjust alignment of the data stream in the buffer in response to locating the at least one alignment marker.

19 Claims, 6 Drawing Sheets

ALIGNMENT DETECTION IN A MULTI-LANE NETWORK INTERFACE

TECHNICAL FIELD

Examples of the present disclosure generally relate to electronic circuits and, in particular, to alignment detection in a multi-lane network interface.

BACKGROUND

Communication systems commonly divide transmitted data into frames, with various forms of control information inserted in or between the frames to ensure that the transmitter and receiver are synchronized. For example, in the IEEE 802.3ba standard for 40 gigabits per second (Gbps) and 100 Gbps Ethernet physical layer, data is transferred using multiple parallel data lanes. Data can arrive at the receiver with some relative timing offset ("skew") between the data lanes. Accordingly, control information in the form of alignment markers (AMs) are inserted periodically into the data stream to allow the receiver to find frame boundaries on each data lane and then remove the skew between data lanes so that the data can be recovered correctly. The IEEE 802.3bj standard defines forward error correction (FEC) features for use on in the 40 Gbps/100 Gbps Ethernet physical layer over backplanes and copper cables. In FEC data lanes, the AMs have the same format as data lanes without FEC defined in 802.3ba, but are distributed in a different pattern within the transmitted frames.

The standard method for locating AMs in a data stream is to perform a bitwise correlation operation at each location where an AM might be located, searching for a known bit pattern. With high bit-rates, such as 100 Gbps, this correlation operation is not straightforward. Either a very large number of correlation circuits is required, operating in parallel, or else a smaller number (perhaps a single correlator) can be swept across the data until alignment is found. Both approaches have disadvantages. With a large bank of parallel correlators, alignment is quick (e.g., around 200 ρs), but has a high cost in terms of silicon area and power consumption. With a single correlator, silicon cost and power consumption are low, but alignment can be slow (e.g., on the order of 10 ms worst case).

SUMMARY

Alignment detection in a multi-lane network interface is described. In one example, an alignment detection circuit comprises a buffer, a candidate selection circuit, and a correlator circuit. The buffer is configured to receive a data stream from a data lane, the data stream including alignment markers delineating data frames, each of the alignment markers having a predefined bit pattern. The candidate selection circuit is configured to identify candidate data blocks in successive data blocks of the data stream provided by the buffer, each of the candidate blocks having a measure of symmetry satisfying a threshold metric indicative of the predefined bit pattern. The correlator circuit is configured to search for at least one of the alignment markers in each of the candidate blocks and adjust alignment of the data stream in the buffer in response to locating the at least one alignment marker.

In another example, a receiver in a multi-lane network interface includes a plurality of data lanes and an alignment processor coupled thereto. The plurality of data lanes each provides a data stream having portions of forward error correction (FEC) codewords between periodic alignment markers delineating data frames, each of the alignment markers having a predefined bit pattern. The alignment processor includes an alignment detection circuit for each of the plurality of data lanes. Each alignment detection circuit comprises a buffer, a candidate selection circuit, and a correlator circuit. The buffer is configured to receive a respective data stream. The candidate selection circuit is configured to identify candidate data blocks in successive data blocks of the respective data stream provided by the buffer, each of the candidate data blocks having a measure of symmetry satisfying a threshold metric indicative of the predefined bit pattern. The correlator circuit is configured to search for at least one of the alignment markers in each of the candidate data blocks and adjust alignment of the respective data stream in the buffer in response to locating the at least one alignment marker.

In another example, a method of detecting alignment of a data stream from a data lane of a multi-lane network interface, the data stream having periodic alignment markers delineating frames comprises: obtaining successive data blocks of the data stream output from a buffer; identifying candidate data blocks in the successive data blocks of the data stream having a measure of symmetry satisfying a threshold metric indicative of a predefined bit pattern of an alignment marker; searching for at least one of the alignment markers in each of the candidate data blocks; and adjusting alignment of the data stream in the buffer in response to locating the at least one alignment marker.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
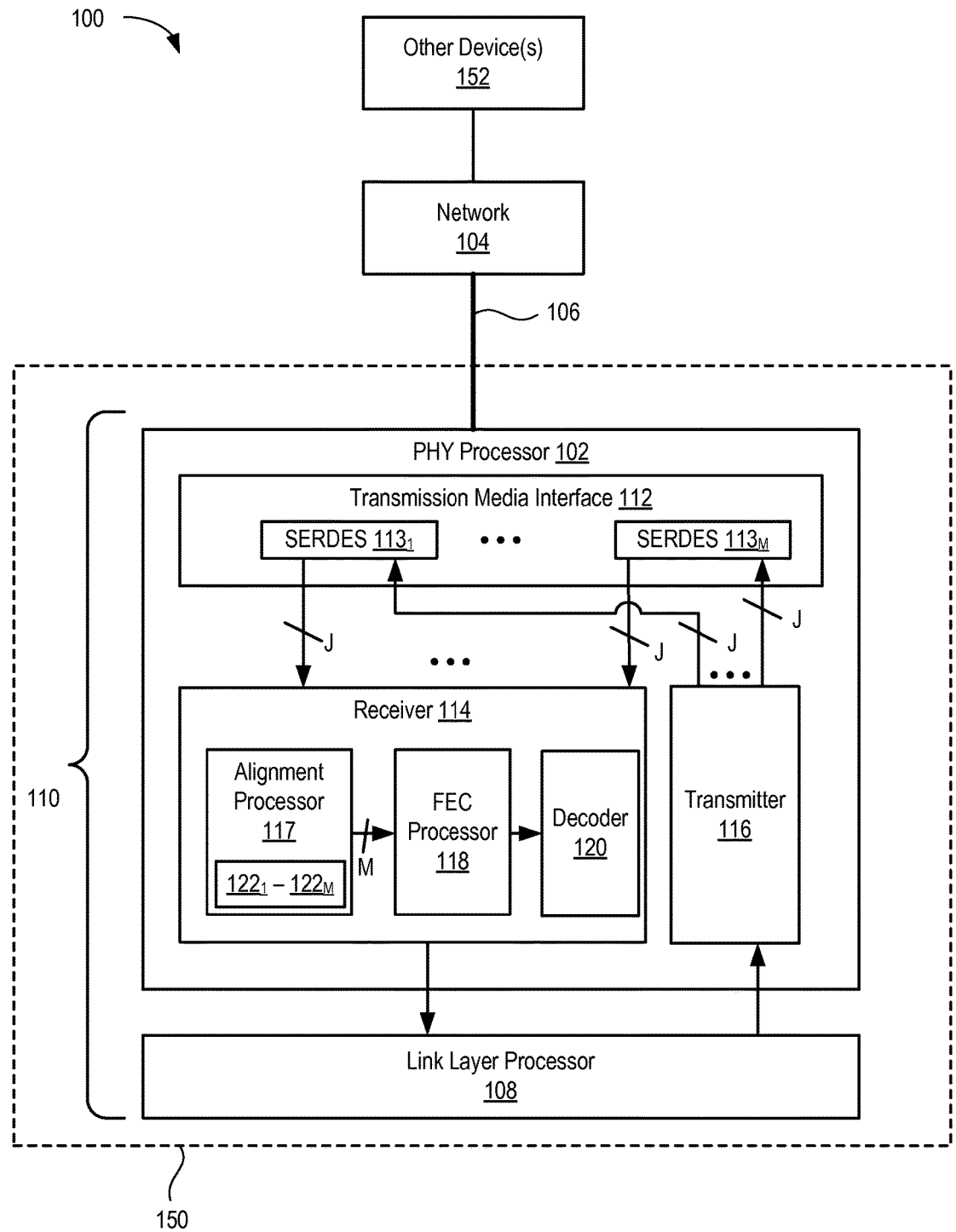
FIG. 1 is a block diagram depicting a communication system according to an example implementation.

Alignment detection in a multi-lane network interface is described. In general, an alignment circuit ("alignment processor") is configured to align data streams on data lanes of the multi-lane network interface to remove inter-lane skew. In example implementations, the multi-lane network interface comprises a high-speed Ethernet interface (e.g., 40 Gbps or 100 Gbps) employing forward error correction (FEC), such as that defined in the IEEE 802.3bj standard. Such a high-speed Ethernet interface includes a plurality of FEC data lanes, each having a data stream with periodic groups of alignment markers (AMs) defining data frames. The alignment processor, however, can operate within other multi-lane network interfaces having the same or similar data stream structure as described herein.

The alignment processor can include an alignment detection circuit for each data lane. Each alignment detection circuit obtains a lock to AMs and locates frame boundaries in the data stream of a respective data lane. AMs of the high-speed Ethernet interface have a specific symmetry in that the first half of each AM is the bitwise inverse of the second half. The alignment detection circuit exploits this symmetrical property of the AMs in order to perform "pre-screening" of the captured data on a block-by-block basis. The alignment detection circuit measures symmetry in successive blocks of the data stream to obtain measures of symmetry referred to as "symmetry scores" or just "scores". The alignment detection circuit can collect symmetry scores for data blocks over one or more data frames, which can be used as a measure of probability that given data blocks contain one or more AMs. The alignment detection circuit can compare the symmetry scores against threshold scores to identify data blocks most likely to have AMs ("candidate data blocks"). That is, each candidate data block has a measure of symmetry that satisfies a threshold metric indicative of one or more AMs. A correlator performs a more detailed analysis of only the candidate blocks to search for AMs, filters out any false positive matches, and establishes a start location in a data frame in case of a correct match. Once each alignment detection circuit has located the frame boundaries, the alignment processor can remove inter-lane skew.

The alignment detection circuit described herein provides for efficient detection and location of AMs in a data stream received from a high-speed Ethernet interface. Using the alignment detection circuit on each data lane provides for rapid synchronization and de-skew with low complexity and low latency, enabling efficient implementation of a receiver for a high-speed Ethernet interface. The alignment detection circuit consumes less silicon area and power as compared to a maximally-sized parallel correlator approach. The alignment detection circuit exhibits lower alignment detection latency than a minimally-sized, single-swept correlator approach. These and further aspects are discussed below with reference to the following figures.

FIG. 1 is a block diagram depicting a communication system 100 according to an example implementation. The communication system 100 comprises a network interface 110 coupled to a network 104 through a transmission medium 106. The network interface 110 can be part of a larger device 150, such as an integrated circuit (IC). In an example implementation, the network interface 110 implements a high-speed Ethernet interface having multiple data lanes with forward error correction (FEC), such as that defined in the IEEE 802.3bj standard. The network interface 110 includes a physical layer (PHY) processor 102 coupled to a link layer processor 108. The PHY processor 102 handles the PHY layer of the high-speed Ethernet interface, and the link layer processor 108 handles the media access control (MAC) layer of the Ethernet interface. The network interface 110 receives a bitstream from the network 104 over the transmission medium 106 (e.g., transmitted by other device(s) 152). The transmission medium 106 can generally include, for example, an optical or electrical backplane, optical or electrical cable, or the like.

The PHY processor 102 includes a transmission media interface 112, a receiver 114, and a transmitter 116. The transmission media interface 112 receives a bitstreams from, and transmits a bitstreams to, the transmission medium 106 at a particular effective bit-rate (e.g., 40 Gbps or 100 Gbps). The transmission media interface 112 handles a physical medium dependent (PMD) sub-layer of the PHY layer. The transmission media interface 112 includes serializer/deserializer (SERDES) circuits $113_1$ through $113_M$, where M is an integer greater than one. Each SERDES $113_1$ through $113_M$ de-serializes a received serial bitstream and provides a J-bit wide data stream, where J is an integer greater than one. Thus, the transmission media interface 112 provides J-bit wide data streams on M parallel data lanes to the receiver 114. In the high-speed Ethernet interface defined in IEEE 802.3bj, M is equal to four. The SERDES $113_1$ through $113_M$ also respectively serialize J-bit wide data streams provided over M parallel data lanes from the transmitter 116 for transmission as M serial bitstreams over the transmission medium 106.

The receiver 114 includes an alignment processor 117, an FEC processor 118, and a decoder 120. The alignment processor 117 includes alignment detection circuits $122_1$ through $122_M$ (collectively "alignment detection circuits 122" or generally a "alignment detection circuit $122_x$, x=1 . . . M). Each of the alignment detection circuits 122 obtains a lock to AMs and locates frame boundaries in the data stream of a respective data lane. The alignment processor 117 removes skew from the data streams across the data lanes and provides M aligned and de-skewed data streams to the FEC processor 118. The FEC processor 118 re-orders and multiplexes the data streams, and performs FEC processing to recover message symbols from FEC codewords. For example, the FEC processor 118 can perform functions of Reed-Solomon (RS) decoding to recover 257-bit symbols from RS codewords, and 256 B/257 B-to-64 B/66 B transcoding to recover 66-bit symbols from messages of 257-bit symbols. The FEC processor 118 provides an error-corrected data stream to the decoder 120. The decoder 120 handles a physical coding sublayer (PCS) of the PHY layer. The decoder 120 decodes the error-corrected data stream to generate a decoded data stream. The decoder 120 provides the decoded data stream to the link layer processor 108 for further layer-2 processing.

Figure 2:
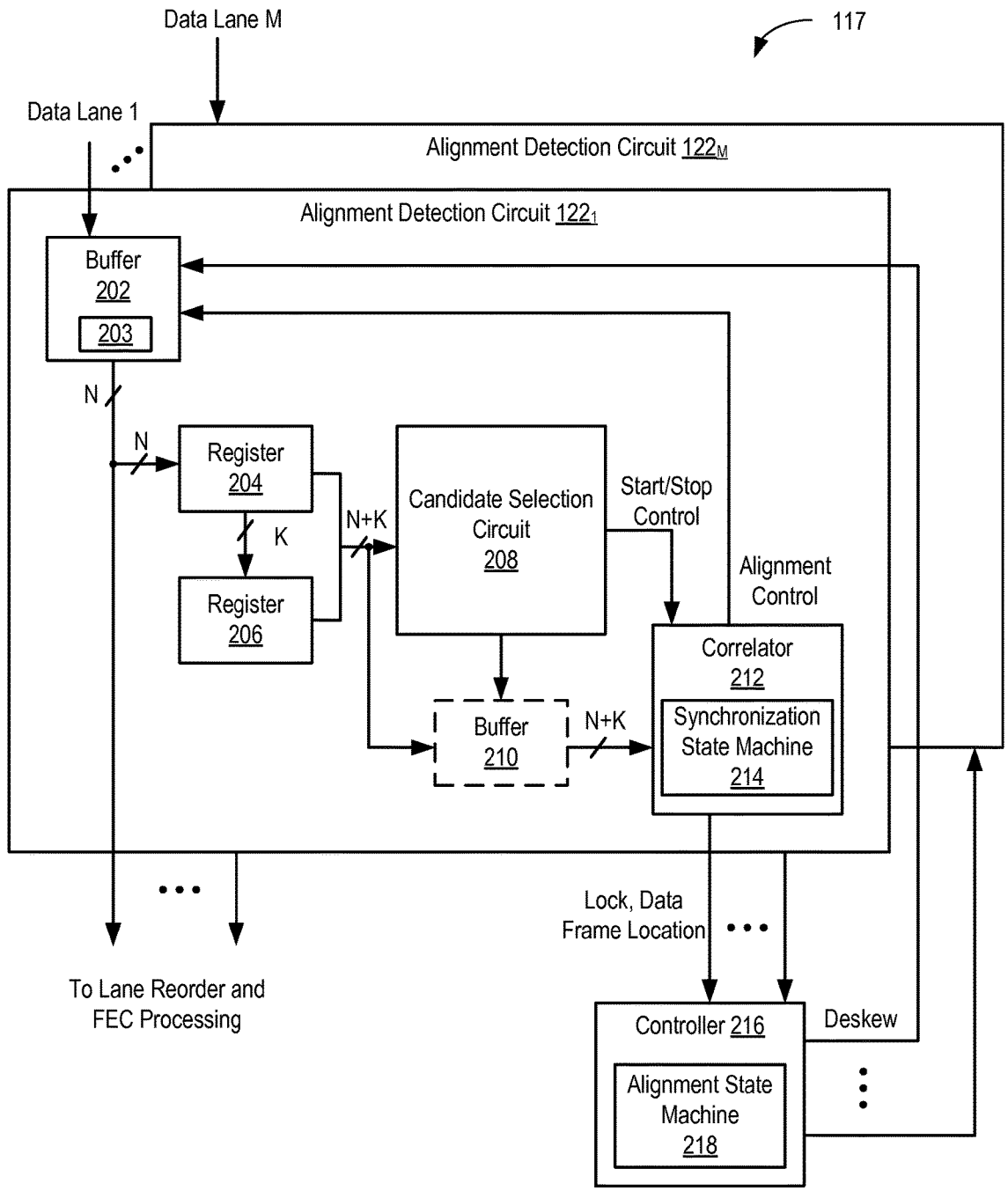
FIG. 2 is a block diagram depicting an alignment processor according to an example implementation.

FIG. 2 is a block diagram depicting the alignment processor 117 according to an example implementation. The alignment processor 117 comprises the alignment detection circuits 122 and a controller 216. Each alignment detection circuit $122_x$ includes a buffer 202, a register 204, a register 206, a candidate selection circuit 208, and a correlator 212. For purposes of clarity, only the alignment detection circuit $122_1$ is shown in detail. The other alignment detection circuits $122_2$ through $122_M$ can be configured identically. Each of the alignment detection circuits 122 receives an input data stream from a respective data lane. Each data stream includes multiplexed data, so the information transmitted on any single data lane cannot be correctly interpreted until aligned and recombined with information on the other data lanes. Each of the alignment detection circuits 122 outputs an aligned and de-skewed data stream on a respective data lane so that such recombination can be achieved.

The buffer 202 is configured to receive a data stream from a respective data lane. The data stream includes periodic AMs that delineate boundaries between frames. The buffer 202 re-times the data stream to a clock domain of the alignment processor 117. That is, the frames of the input data stream are mapped to frames in the clock domain of the alignment processor 117. The buffer 202 also includes alignment logic 203 configured to control the alignment of the data stream in the buffer 202 with bit-wise precision to adjust alignment of frames input to the buffer 202 and frames output from the buffer 202. For example, the alignment logic 203 can selectively add or drop one or more bits of the data stream in response to an alignment control signal from the correlator 212.

The buffer 202 can include, for example, a first-in, first-out (FIFO) circuit having a width of N, where N is an integer greater than one. The width N of the words in the buffer 202 can be selected based on the bit-rate of the input data stream and the clock rate of the alignment processor 117. For example, if the bit-rate of the input data stream is approximately 25 Gbps (e.g., 100 Gbps Ethernet across 4 lanes), and the clock rate of the alignment processor 117 is 312.5 MHz, then the words in the buffer can be 80 bits wide (e.g., N=80). Other widths are possible depending on the bit-rate of the data stream and the clock rate of the alignment processor 117. In general, the buffer 202 forms and outputs N-bit words from the input data stream.

The depth of the buffer (e.g., FIFO) can be selected depending on the clock rate of the alignment processor 117, the maximum expected skew across the data lanes, and the bit-rate of the input data stream. For example, as defined in the IEEE 802.3bj standard, the maximum allowable skew is 180 ns. Continuing with the example above, if the clock rate of the alignment processor 117 is 312.5 MHz, then the depth of the buffer 202 can be sixty-four (64) 80-bit words. Other depths are possible depending on the bit-rate of the input data stream, maximum allowable skew, and clock rate of the alignment processor 117. Prior to AM lock and de-skew, the front of the buffer 202 can be set at the mid-point. After AM detection and data frame alignment, the controller 216 can adjust the front of the buffer 202 forward or backward from the mid-point to decrease or increase delay through the buffer 202 in response to a de-skew control signal.

The register 204 receives successive N-bit words from the buffer 202 over successive clock cycles of the alignment processor 117. The register 206 receives successive K-bit words, or successive portions of N-bit words, output from the register 204 over successive clock cycles of the alignment processor 117. In general, the register 206 stores K-bit words, where K is less than or equal to N. In a given clock cycle, the register 204 stores a current N-bit word, and the register 206 stores a previous K-bit word or a portion of a previous N-bit word. Together, the N-bit word stored in the register 204 and the K-bit word stored in the register 206 comprise a block from the data stream to be processed. A block can be larger than an N-bit word in order to detect AMs that straddle word boundaries.

The candidate selection circuit 208 receives successive (N+K)-bit blocks from the combined output of the registers 204 and 206. The candidate selection circuit 208 is configured to identify candidate blocks in the successive input blocks. Each candidate block includes a measure of symmetry ("symmetry score" or "score") that satisfies a threshold metric indicative of a predefined bit pattern of an AM. As noted above, AMs of the high-speed Ethernet interface have a specific symmetry in that the first half of each AM is the bitwise inverse of the second half. The candidate selection circuit 208 exploits this symmetrical property to pre-screen the input blocks on a block-by-block basis. The candidate selection circuit 208 scores each input block in terms of symmetry. After one or more data frames have been processed, the candidate selection circuit 208 flags those input blocks having a symmetry score that satisfies a threshold score as candidate blocks that warrant further processing by the correlator 212. Conversely, those input blocks that are not candidate blocks do not warrant further processing by the correlator 212. Thus, the correlator 212 does not have to process each and every block, which reduces AM detection latency.

The correlator 212 is configured to access (N+K)-bit blocks. The correlator 212 receives a control signal from the candidate selection circuit 208 (referred to as "start/stop control"). The correlator 212 only performs detailed analysis (e.g., correlation) on candidate blocks as determined by the candidate selection circuit 208. The candidate selection circuit 208 asserts the start/stop control signal to cause the correlator 212 to perform correlation on a given candidate block. The candidate selection circuit 208 de-asserts the start/stop control signal to cause the correlator 212 to skip the correlation process for blocks that are not candidate blocks.

In one example, a alignment detection circuit $122_x$ includes a buffer 210 configured to store (N+K)-bit words comprising candidate data blocks. The buffer 210 can comprise, for example, a FIFO. For each identified candidate block, the candidate selection circuit 208 controls the buffer 210 to store a candidate data block. The buffer 210 queues candidate data blocks for processing by the correlator 212. The correlator 212 obtains (N+K)-bit candidate blocks from the buffer 210. In another example, the buffer 210 is omitted and the correlator 212 obtains blocks directly from the combined output of the registers 204 and 206 in response to the candidate selection circuit 208 asserting the start/stop control signal.

The correlator 212 performs a correlation of each candidate block to detect an AM and determine the start location of the AM within the candidate block. In an example, the correlator 212 implements a synchronization state machine 214 that controls and tracks the AM synchronization process. The correlator 212 provides an alignment control signal to the buffer 202. In response to determining the start location of an AM within a candidate block, the correlator 212 adjusts the alignment of the data stream within the buffer 202. For example, the buffer 202 can adjust the alignment by adding or dropping one or more bits from the data stream. The correlator 212 drives alignment feedback to the buffer 202 in order to cause the group of AMs in an input data frame to be aligned to a set of blocks in an output data frame of the buffer 202. Upon determining that the AMs are correctly aligned with respect to the output data frame, the correlator 212 asserts a lock signal and provides data frame location to the controller 216. The correlator 212 de-asserts the lock signal if alignment is lost or alignment has yet to be achieved.

Each of the alignment detection circuits 122 operates as described above. The controller 216 implements an alignment state machine 218 that is configured to control and track the alignment of data frames across the data lanes. The controller 216 receives lock signals and data frame locations from the correlator 212 in each of the alignment detection circuits 122. When all of the lock signals are asserted, the controller 216 adjusts the front of each buffer 202 in the alignment detection circuits 122 to align the data frames across the data lanes. The output of the buffer 202 in each of the alignment detection circuits 122 is directly provided to the FEC processor 118 for further processing. Thus, the alignment detection circuits 122 do not introduce latency into the data streams.

Given the example dimensions above (e.g., 80-bit words and a clock frequency of 312.5 MHz), an alignment detection circuit 122 can achieve alignment of the input and output frames of the buffer 202 in approximately 80 clock cycles (e.g., approximately 250 ns). This additional delay is negligible compared to the 200 µs delay between groups of AMs, which is the dominant factor in the time it takes for frame synchronization. Each alignment detection circuit 122 includes only a single correlator circuit 212, which is more area and power efficient than alignment approaches that use large banks of parallel correlators. Moreover, the pre-screening process performed by the candidate selection circuit 208 reduces latency as compared to alignment approaches that utilize a single-swept correlator that processes all data blocks.

Figure 3A:
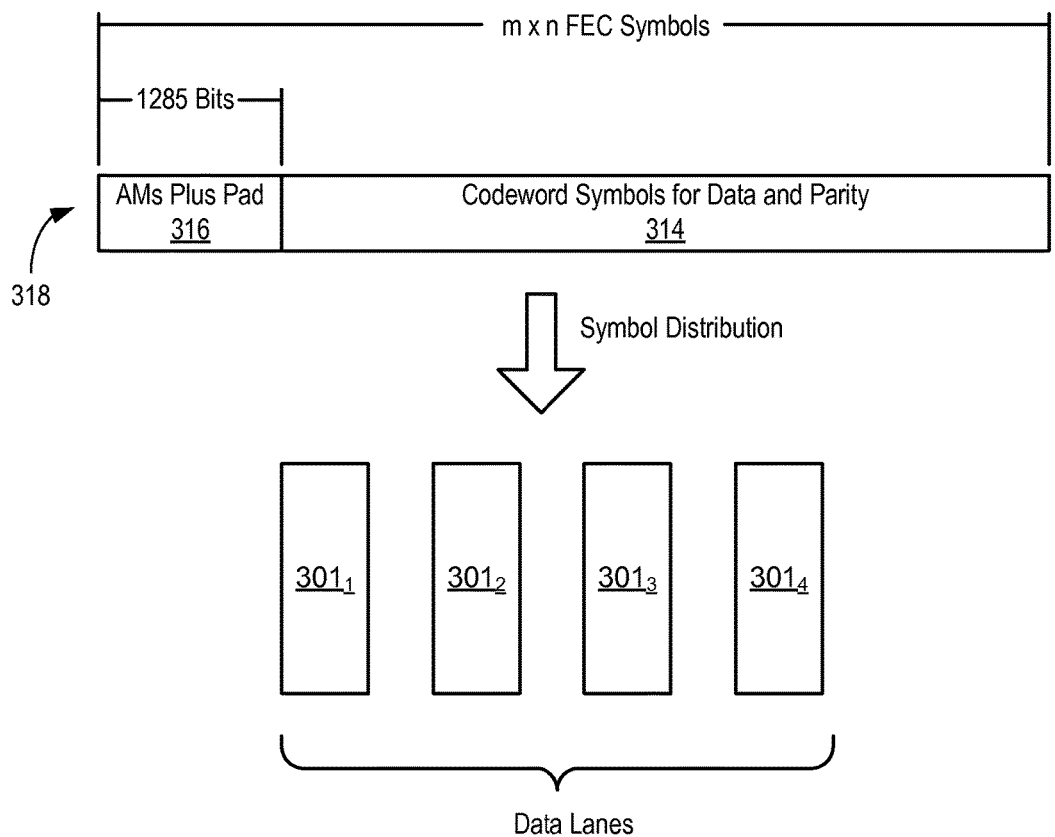
FIG. 3A illustrates the process of symbol distribution of an FEC codeword across four parallel data lanes in a multi-lane network interface.
Figure 3B:
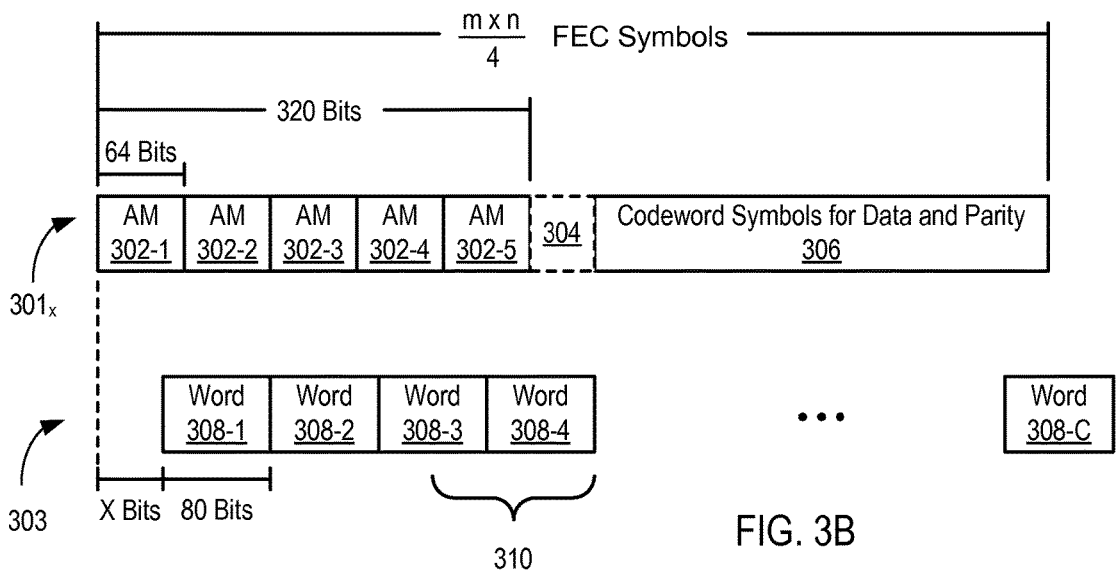
FIG. 3B illustrates AM alignment and frame detection on a given data lane according to an example implementation.

FIG. 3A illustrates the process of symbol distribution of an FEC codeword across four parallel data lanes in a multi-lane network interface. FIG. 3B illustrates AM alignment and frame detection on a given data lane according to an example implementation. As shown in FIG. 3A, a given set 318 of FEC codewords comprises a group of AMs plus a pad ("AMs plus pad 316") and codeword symbols for data and parity 314. In a high-speed Ethernet interface as defined in IEEE 802.3bj, each AM comprises 64 bits. A group of 20 AMs plus a 5-bit pad (e.g., 1285 bits) appear every $m^{th}$ FEC codeword, each FEC codeword comprising n symbols. Thus, the set 318 of symbols includes m×n FEC symbols, where the first 1285 bits comprise the AMs plus pad 316. For example, IEEE 802.3bj defines an RS codeword having 528 ten-bit symbols (e.g., n=528), with 20 AMs plus 5-bit pad appearing every $4096^{th}$ RS codeword (e.g., m=4096). Other codeword lengths are defined, such as RS codewords having 544 ten-bit symbols (e.g., n=544). The 20 AMs plus 5-bit pad can appear more frequently, such as every other codeword (e.g., m=2). In general, the values of m and n can take on other values depending on the particular multi-lane network interface and type of FEC. The set 318 of FEC symbols are distributed across the parallel data lanes. For example, the set 318 of FEC symbols can be distributed across four data lanes. Thus, the set 318 of FEC symbols is divided into four frames $301_1$ through $301_4$, one frame on each data lane. As noted above, information in any given frame $301_x$ cannot be correctly interpreted until aligned and recombined with information in the other frames 301. The 20 AMs are divided among the data lanes (e.g., 5 AMs per data lane given four data lanes). The process is repeated for each set 318 of FEC symbols such that each data lane has a sequence of frames $301_x$ delineated by groups of AMs comprising one or more AMs.

As shown in FIG. 3B, each frame $301_x$ of a given data lane includes a group of AMs that delineate frame boundaries. In accordance with the scheme defined in FIG. 3A above, each AM comprises 64-bits, and a group of five AMs appears periodically in the data stream on each data lane. Accordingly, a frame $301_x$ can include five AMs 302-1 through 302-5 (collectively "AMs 302"). In general, a frame $301_x$ can include one or more AMs. The AMs 302 comprise 320 bits. The remaining portion 306 of the frame $301_x$ includes codeword symbols for data and parity. On one data lane, there is a 5-bit pad 304 between the AMs 302 and the remaining portion 306. The other data lanes do not include the 5-bit pad 304. The length of a frame $301_x$ is (m×n)/4 FEC symbols.

In the example above, the buffer 202 re-times the data stream to produce 80-bit words. The buffer 202 maps the frame $301_x$ in the input data stream to a frame 303 of words 308-1 through 308-C, where C equals (m×n×10)/(4×80) (collectively referred to as "words 308"), assuming 10-bit symbols. For example, if the FEC codeword includes n=528 ten-bit symbols distributed across four data lanes, and 20 AMs plus 5-bit pad are transmitted as the first 1285 bits of every m=$4096^{th}$ FEC codeword, then the words 308 include C=67,584 words per frame 303. If the frames $301_x$ and 303 are aligned, the five AMs 302-1 through 302-5 fit into four words 308-1 through 308-4. Before alignment, the AMs 302-1 through 302-5 are offset from the words 308-1 through 308-4 by X bits. An alignment detection circuit 122 operates as described above to process blocks of the frame 303, detect AMs, and adjust alignment of the frame $301_x$ with respect to the frame 303 so that the AMs 302-1 through 302-5 are aligned with the words 308-1 through 308-4. A given block 310 comprises a current word (e.g., the word 308-4) and at least a portion of a previous word (e.g., the word 308-3). Each block can comprise more than one of the words 308 in order to detect AMs that straddle word boundaries (e.g., the AM 302-5 straddling the words 308-3 and 308-4 prior to alignment of the frames $301_x$ and 303). The correlator 212 controls the buffer 202 to add or drop bits in order to achieve proper alignment between the frames $301_x$ and 303.

Figure 4:
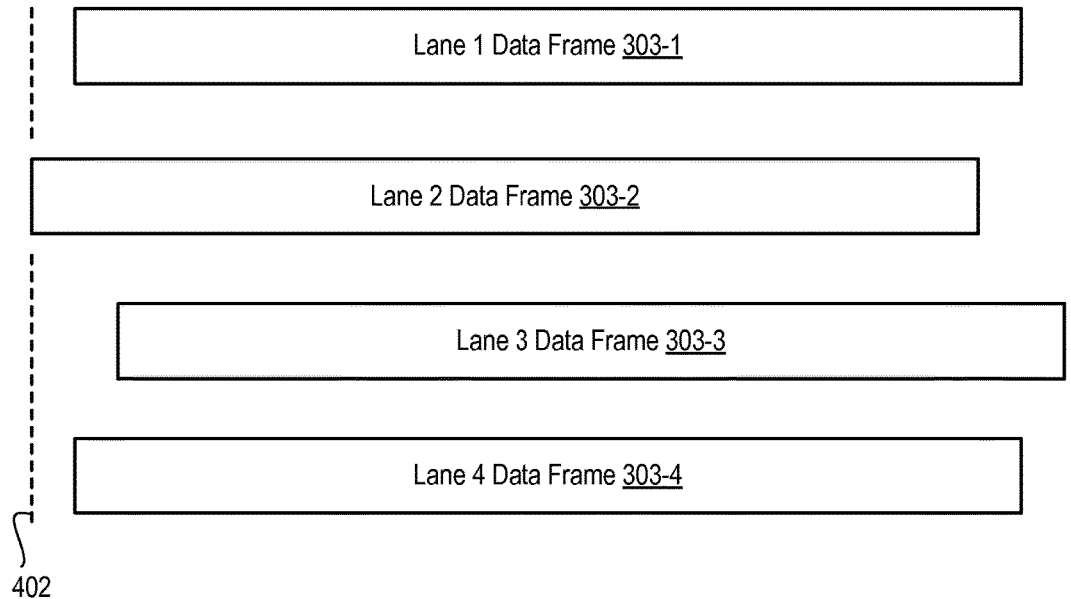
FIG. 4 illustrates data frame alignment and de-skew according to an example implementation.

FIG. 4 illustrates data frame alignment and de-skew according to an example implementation. Frames 303-1 through 303-4 for data lanes 1 through 4, respectively, are shown as being skewed with respect to a reference time 402. Once the boundaries of the frames 303-1 through 303-4 are located by the alignment detection circuits 122, the alignment processor 117 selectively increases or decreases delay of one or more data lanes to align the data frames (e.g., by increasing or decreasing delay through the buffer 202 in each alignment detection circuit 122).

Figure 5:
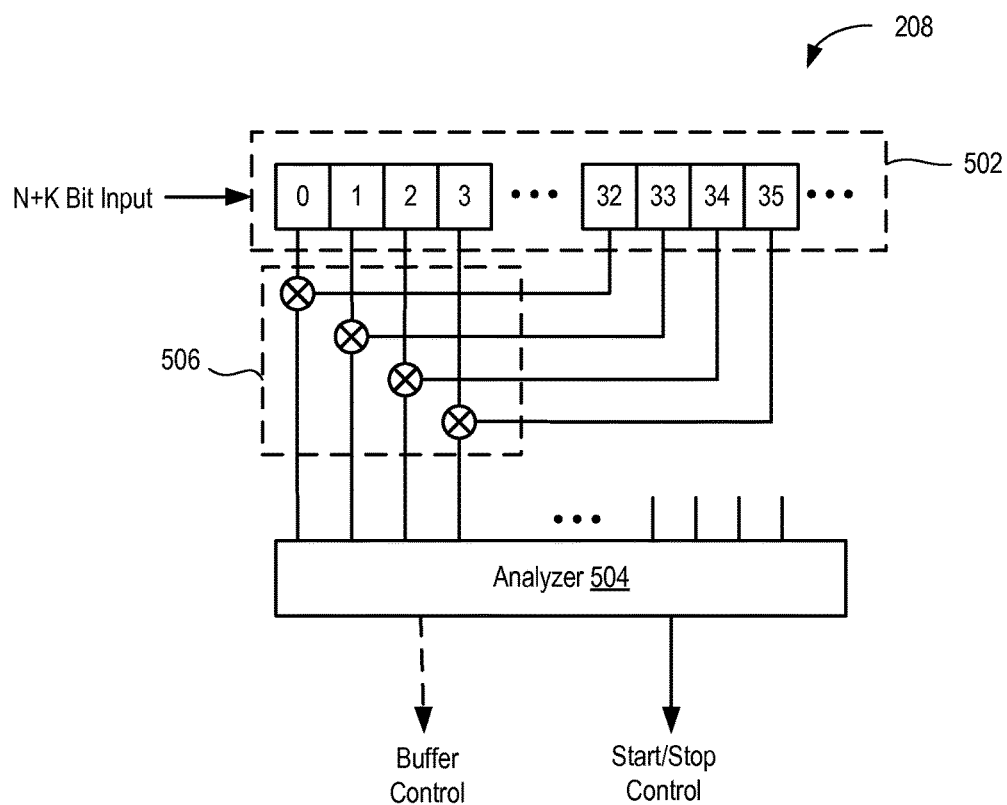
FIG. 5 is a block diagram depicting a candidate selection circuit according to an example implementation.

FIG. 5 is a block diagram depicting the candidate selection circuit 208 according to an example implementation. The candidate selection circuit 208 includes a register 502, an analyzer 504, and a plurality of exclusive OR (XOR) gates 506. The register 502 is configured to receive an (N+K)-bit block from the combined output of the registers 204 and 206. In general, the register 502 includes (N+K) storage locations designated 0, 1, 2, 3, . . . , 32, 33, 34, 35, . . . (N+K)–1. Each location in register 502 is compared with another location offset by 32 bits using an XOR gate of XOR gates 506. For example, location 0 is compared with location 32, location 1 is compared with location 33, location 2 is compared with location 34, location 3 is compared with location 35, and so on. Outputs of the XOR gates 506 are coupled to the analyzer 504. The analyzer 504 generally determines whether a given block is a candidate block based on output of the plurality of XOR gates 506 over one or more frames.

In an example implementation, the analyzer 504 generates a symmetry score for each input block based on output of the plurality of XOR gates 506. In some examples, the symmetry score is generated over multiple frames. For example, the analyzer 504 can maintain a running symmetry score for each block from frame-to-frame (e.g., block 310 in the frame 303). Since the AMs appear periodically with the data stream, some blocks will have the same or similar symmetry score from frame-to-frame. The analyzer 504 can accumulate symmetry scores, maintain a running average of symmetry scores, or otherwise maintain a combined symmetry score for each block within the frame 303. In other examples, the symmetry score for a given block includes a single symmetry score generated for a single frame.

Symmetry scores for some blocks will be higher than symmetry scores for other blocks. The analyzer 504 compares the symmetry scores to a threshold score to identify candidate blocks for further analysis by the correlator 212. In general, blocks with higher symmetry scores are more likely to have one or more AMs. The analyzer 504 can generate the start/stop control signal and, in some examples, a buffer control signal to queue the candidate blocks for processing by the correlator 212.

In general, a symmetry score is based on the number of logic 1's in the output of the plurality of XOR gates 506. The output of an XOR gate is logic 1 if the input bits are different, and logic 0 if the input bits are the same. When an AM word is stored in the register 502, the output of the plurality of XOR gates 506 will have a string or strings of logic 1's, since the first 32 bits of an AM are a bitwise inverse of the second 32 bits. In absence of noise, the output of the plurality of XOR gates 506 will include a string of 32 logic 1's. In practice, one or more bits of an AM may be corrupted by noise, and so the output of the plurality of XOR gates 506 may have multiple strings of logic 1's separated by one or more logic 0's. The non-AM portions of the data stream, on the other hand, are scrambled at the transmitter and thus exhibit no strong correlation over a distance of 32 bits. Thus, when non-AM data is stored in the register 502, the output of the plurality of XOR gates 506 will be a roughly even mix of logic 1's and logic 0's.

In one example, the symmetry score can be a count of the logic 1's in the output of the plurality of XOR gates 506. The count of the logic 1's can be maintained over one or more frames. The threshold score can be a threshold count of the logic 1's indicative of the bit pattern of the AM. In another example, the symmetry score can be a length of the longest string of logic 1's. The string length can be maintained over one or more frames. The threshold score can be a threshold string length of logic 1's indicative of the bit pattern of the AM. The analyzer 504 can use other techniques for generating symmetry scores that measure the presence or absence of the predefined bit pattern of an AM.

Figure 6:
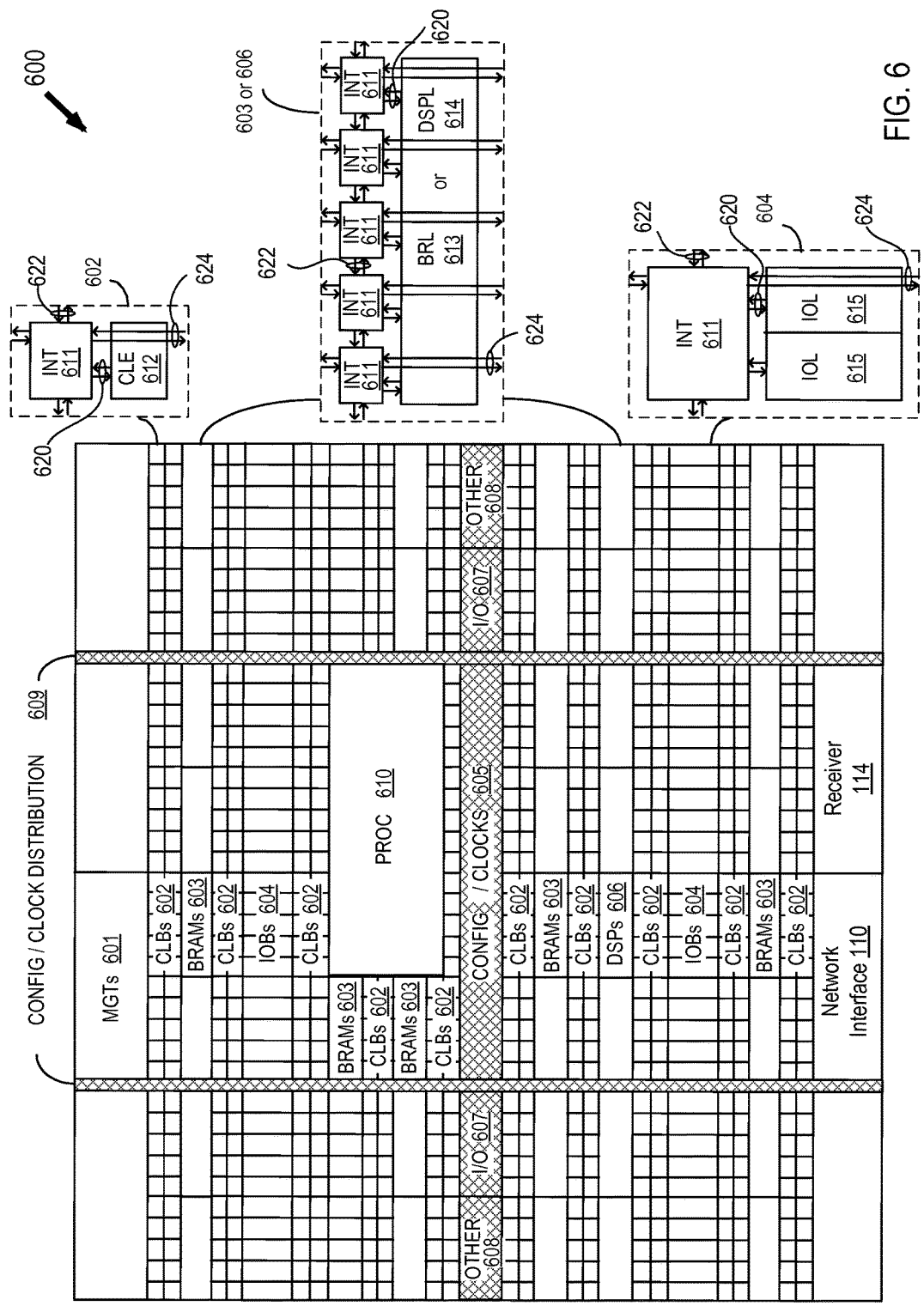
FIG. 6 illustrates an FPGA architecture according to an example implementation.

The receiver 114 can be used in any type of IC that includes a multi-lane network interface. In an example, the receiver 114 can be used in a programmable IC, such as a field programmable gate array (FPGA). FIG. 6 illustrates an FPGA architecture 600 that includes a large number of different programmable tiles including multi-gigabit transceivers ("MGTs") 601, configurable logic blocks ("CLBs") 602, random access memory blocks ("BRAMs") 603, input/output blocks ("IOBs") 604, configuration and clocking logic ("CONFIG/CLOCKS") 605, digital signal processing blocks ("DSPs") 606, specialized input/output blocks ("I/O") 607 (e.g., configuration ports and clock ports), and other programmable logic 608 such as digital clock managers, analog-to-digital converters, system monitoring logic, and so forth. Some FPGAs also include dedicated processor blocks ("PROC") 610.

In some FPGAs, each programmable tile can include at least one programmable interconnect element ("INT") 611 having connections to input and output terminals 620 of a programmable logic element within the same tile, as shown by examples included at the top of FIG. 6. Each programmable interconnect element 611 can also include connections to interconnect segments 622 of adjacent programmable interconnect element(s) in the same tile or other tile(s). Each programmable interconnect element 611 can also include connections to interconnect segments 624 of general routing resources between logic blocks (not shown). The general routing resources can include routing channels between logic blocks (not shown) comprising tracks of interconnect segments (e.g., interconnect segments 624) and switch blocks (not shown) for connecting interconnect segments. The interconnect segments of the general routing resources (e.g., interconnect segments 624) can span one or more logic blocks. The programmable interconnect elements 611 taken together with the general routing resources implement a programmable interconnect structure ("programmable interconnect") for the illustrated FPGA.

In an example implementation, a CLB 602 can include a configurable logic element ("CLE") 612 that can be programmed to implement user logic plus a single programmable interconnect element ("INT") 611. A BRAM 603 can include a BRAM logic element ("BRL") 613 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 606 can include a DSP logic element ("DSPL") 614 in addition to an appropriate number of programmable interconnect elements. An IOB 604 can include, for example, two instances of an input/output logic element ("IOL") 615 in addition to one instance of the programmable interconnect element 611. As will be clear to those of skill in the art, the actual I/O pads connected, for example, to the I/O logic element 615 typically are not confined to the area of the input/output logic element 615.

In the pictured example, a horizontal area near the center of the die (shown in FIG. 6) is used for configuration, clock, and other control logic. Vertical columns 609 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, processor block 610 spans several columns of CLBs and BRAMs. The processor block 610 can various components ranging from a single microprocessor to a complete programmable processing system of microprocessor(s), memory controllers, peripherals, and the like.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA. Moreover, the FPGA of FIG. 6 illustrates one example of a programmable IC that can employ examples of the interconnect circuits described herein. The interconnect circuits described herein can be used in other types of programmable ICs, such as complex programmable logic devices (CPLDs) or any type of programmable IC having a programmable interconnect structure for selectively coupling logic elements.

The FPGA 600 can include the network interface 110 shown in FIG. 1, including the receiver 114. In one example, the receiver 114 comprises a dedicated circuit formed alongside the FPGA 600. In another example, at least a portion of the receiver 114 can be configured using programmable logic of the FPGA 600 (e.g., the receiver 114 or a portion thereof can be an Intellectual Property (IP) core).

Figure 7:
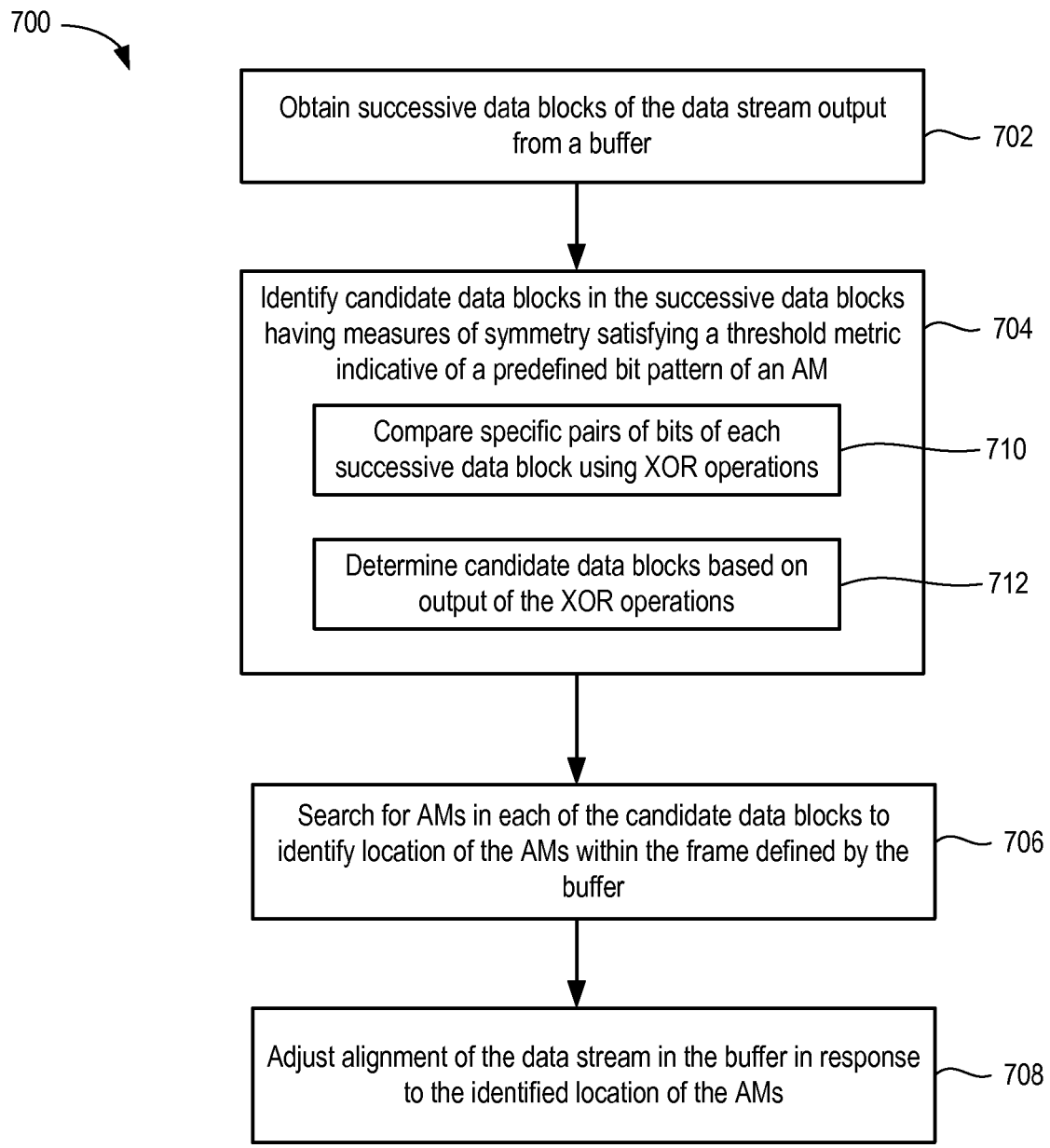
FIG. 7 is a flow diagram depicting a method of detecting alignment of a data stream on a data lane of a multi-lane network interface according to an example implementation.

FIG. 7 is a flow diagram depicting a method 700 of detecting alignment of a data stream on a data lane of a multi-lane network interface according to an example implementation. The method 700 can be performed by the alignment processor 117 of the receiver 114 shown in FIG. 1. The method 700 begins at step 702, where the alignment processor 117 obtains successive data blocks of the data stream output from a buffer. At step 704, the alignment processor 117 identifies candidate data blocks having measures of symmetry satisfying a threshold metric indicative of a predefined bit pattern of an AM. At step 706, the alignment processor 117 searches for AMs in each of the candidate data blocks to identify location of the AMs within the frame defined by the buffer. At step 708, the alignment processor 117 adjusts alignment of the data stream within the buffer in response to the identified location of the AMs. The alignment processor 117 can perform the method 700 for each data lane being processed by the receiver 114. The aligned data streams can then be processed by the alignment processor 117 to remove inter-lane skew.

In an example, the step 704 includes steps 710 and 712. At step 710, the alignment processor 117 compares specific pairs of bits of each successive data block using XOR operations (e.g., bits that are 32-bits apart). At step 712, the alignment processor 117 determines candidate data blocks based on output of the XOR operations.

While the foregoing is directed to specific examples, other and further examples may be devised without departing from the basic scope thereof, and the scope thereof is determined by the claims that follow.

What is claimed is:

1. An alignment detection circuit, comprising:
   a buffer to receive a data stream from a data lane, the data stream including alignment markers delineating data frames, each of the alignment markers having a predefined bit pattern having a symmetry such that a first half of the predefined bit pattern is the bitwise inverse of a second half of the predefined bit pattern;
   a candidate selection circuit to identify only those candidate data blocks in successive data blocks of the data stream provided by the buffer that have a measure of symmetry satisfying a threshold metric indicative of the symmetry of the predefined bit pattern; and
   a correlator circuit coupled to the candidate selection circuit to search for at least one of the alignment markers in only the candidate data blocks and adjust alignment of the data stream in the buffer in response to locating the at least one alignment marker.

2. The alignment detection circuit of claim 1, further comprising:
   a first register to store successive words output by the buffer; and
   a second register to store at least a portion of successive words output by the first register;
   wherein each of the successive data blocks of the data stream comprises a concatenation of data stored in the first and second registers.

3. The alignment detection circuit of claim 2, wherein the correlator circuit is configured to access the successive data blocks, and wherein the candidate selection circuit selectively enables the correlator circuit to search for the at least one alignment marker in only the candidate data blocks.

4. The alignment detection circuit of claim 3, wherein the correlator circuit is configured to access the successive data blocks from the first and second registers.

5. The alignment detection circuit of claim 3, further comprising:
   another buffer to store the successive data blocks of the data stream;
   wherein the correlator circuit is configured to access the successive data blocks from the other buffer.

6. The alignment detection circuit of claim 1, wherein the candidate selection circuit comprises:
   a plurality of exclusive OR (XOR) gates each configured to compare specific bit pairs in each of the successive data blocks; and
   an analysis circuit to determine whether a data block is a candidate data block based on output of the plurality of XOR gates.

7. The alignment detection circuit of claim 6, wherein the measure of symmetry comprises a number of logic '1' values in the output of the plurality of XOR gates, the threshold metric comprises a threshold number of logic '1' values, and the analysis circuit is configured to count the number of logic '1' values in the output of the plurality of XOR gates and compare the number of logic '1' values to the threshold number of logic '1' values.

8. The alignment detection circuit of claim 6, wherein the measure of symmetry comprises a length of a string of logic '1' values in the output of the plurality of XOR gates, the threshold metric comprises a threshold string length, and the analysis circuit is configured to identify the length of a string of logic '1' values in the output of the plurality of XOR gates and compare the length of the string to the threshold string length.

9. The alignment detection circuit of claim 2, wherein the data stream comprises portions of forward error correction (FEC) codewords between periodic groups of the alignment markers.

10. A receiver in a multi-lane network interface, comprising:
    a plurality of data lanes each providing a data stream having portions of forward error correction (FEC) codewords between periodic alignment markers delineating data frames, each of the alignment markers having a predefined bit pattern having a symmetry such that a first half of the predefined bit pattern is a bitwise inverse of a second half of the predefined bit pattern;
    an alignment processor coupled to plurality of data lanes, the alignment processor including an alignment detection circuit for each of the plurality of data lanes, each alignment detection circuit comprising:
      a buffer to receive a respective data stream;
      a candidate selection circuit to identify only those candidate data blocks in successive data blocks of the respective data stream provided by the buffer that have a measure of symmetry satisfying a threshold metric indicative of the symmetry of the predefined bit pattern; and
      a correlator circuit coupled to the candidate selection circuit to search for at least one of the alignment markers in only the candidate data blocks and adjust alignment of the respective data stream in the buffer in response to locating the at least one alignment marker.

11. The receiver of claim 10, wherein the correlator circuit adjusts the alignment of the respective data stream to align the data frames with output frames of the buffer, the receiver further comprising:

a controller to remove inter-lane skew from the plurality of data lanes in response to alignment of the data frames with output frames of the buffer in each alignment detection circuit.

12. The receiver of claim 10, wherein the candidate selection circuit in each alignment detection circuit comprises:
a plurality of exclusive OR (XOR) gates each configured to compare specific bit pairs in each of the successive data blocks; and
an analysis circuit to determine whether a data block is a candidate data block based on output of the plurality of XOR gates.

13. The receiver of claim 12, wherein the measure of symmetry comprises a number of logic '1' values in the output of the plurality of XOR gates, the threshold metric comprises a threshold number of logic '1' values, and the analysis circuit is configured to count the number of logic '1' values in the output of the plurality of XOR gates and compare the number of logic '1' values to the threshold number of logic '1' values.

14. The receiver claim 12, wherein the measure of symmetry comprises a length of a string of logic '1' values in the output of the plurality of XOR gates, the threshold metric comprises a threshold string length, and the analysis circuit is configured to identify the length of a string of logic '1' values in the output of the plurality of XOR gates and compare the length of the string to the threshold string length.

15. The receiver of claim 12, wherein at least a portion of each alignment detection circuit is configured in programmable logic of a field programmable gate array (FPGA).

16. A method of detecting alignment of a data stream from a data lane of a multi-lane network interface, the data stream having periodic alignment markers delineating frames, each of the alignment markers having a predefined bit pattern having a symmetry such that a first half of the predefined bit pattern is the bitwise inverse of a second half of the predefined bit pattern, the method comprising:

obtaining successive data blocks of the data stream output from a buffer;
identifying only those candidate data blocks in the successive data blocks of the data stream that have a measure of symmetry satisfying a threshold metric indicative of the symmetry of the predefined bit pattern;
searching for at least one of the alignment markers in only the candidate data blocks; and
adjusting alignment of the data stream in the buffer in response to locating the at least one alignment marker during the step of searching.

17. The method of claim 16, wherein the step of identifying candidate data blocks comprises:
comparing specific bit pairs in each of the successive data blocks using a plurality of exclusive OR (XOR) operations; and
determining whether a data block is a candidate data block based on results of the plurality of XOR operations.

18. The method of claim 17, wherein the measure of symmetry comprises a number of logic '1' values in the results of the plurality of XOR operations, the threshold metric comprises a threshold number of logic '1' values, and the step of determining comprises:
counting the number of logic '1' values in the results of the plurality of XOR operations; and
comparing the number of logic '1' values to the threshold number of logic '1' values.

19. The method of claim 17, wherein the measure of symmetry comprises a length of a string of logic '1' values in the results of the plurality of XOR operations, the threshold metric comprises a threshold string length, and the step of determining comprises:
identifying a length of a string of logic '1' values in the results of the plurality of XOR operations; and
comparing the length of the string to the threshold string length.

* * * * *